Dec. 2, 1930.　　　　O. H. SPENCER　　　1,783,318
ENGINE COOLING COWL
Filed June 17, 1929　　　3 Sheets-Sheet 1

Owen H. Spencer
Inventor

Dec. 2, 1930.　　　O. H. SPENCER　　　1,783,318
ENGINE COOLING COWL
Filed June 17, 1929　　　3 Sheets-Sheet 2
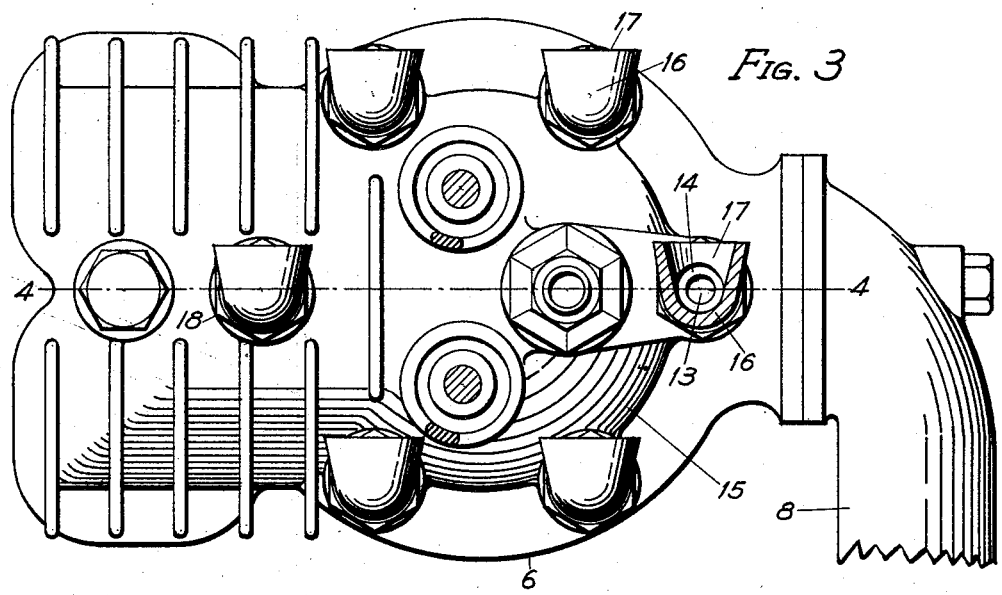
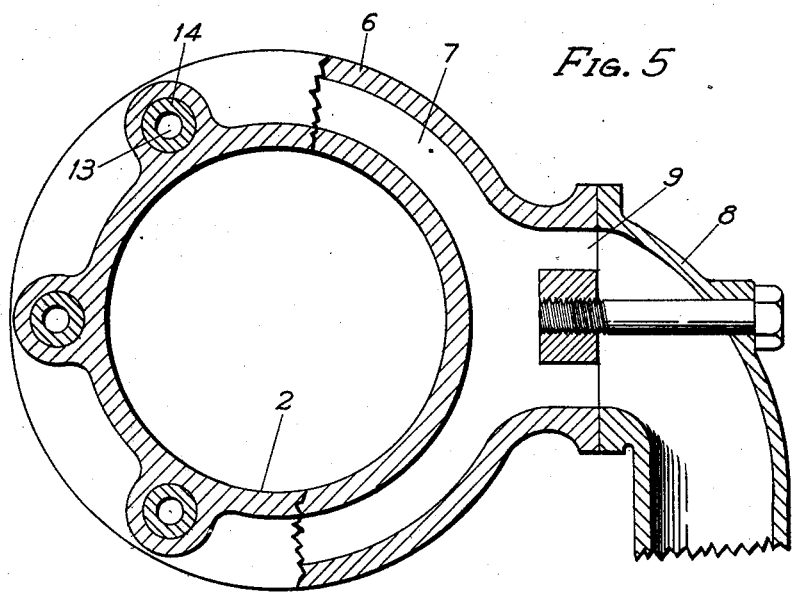
Owen H. Spencer
Inventor Dec. 2, 1930. O. H. SPENCER 1,783,318
ENGINE COOLING COWL
Filed June 17, 1929  3 Sheets-Sheet 3

Owen H. Spencer
Inventor

Patented Dec. 2, 1930

1,783,318

UNITED STATES PATENT OFFICE

OWEN H. SPENCER, OF INDIANAPOLIS, INDIANA

ENGINE-COOLING COWL

Application filed June 17, 1929. Serial No. 371,362.

This invention relates to air cooling means for internal combustion engines and the prime feature of the invention is the incorporation with the escape openings for the air employed in cooling the engine of a cowl arranged to prevent back drafts.

A further feature of the invention is in so arranging and mounting the cowls that the discharge end thereof will be directed away from the direction of travel of the air blast employed for cooling the exterior of the engine.

A further feature of the invention is the provision of means for creating a blast of air and directing a portion thereof interiorly and a portion thereof exteriorly of the engine.

Other objects and advantages will be hereinafter more fully set forth and pointed out in the accompanying specification.

In the accompanying drawings which are made a part of this application,

Figure 3 is an enlarged top plan view of one cylinder of an engine with parts in section.

Figure 5 is a sectional view as seen along line 5—5, Fig. 4.

Figure 1:
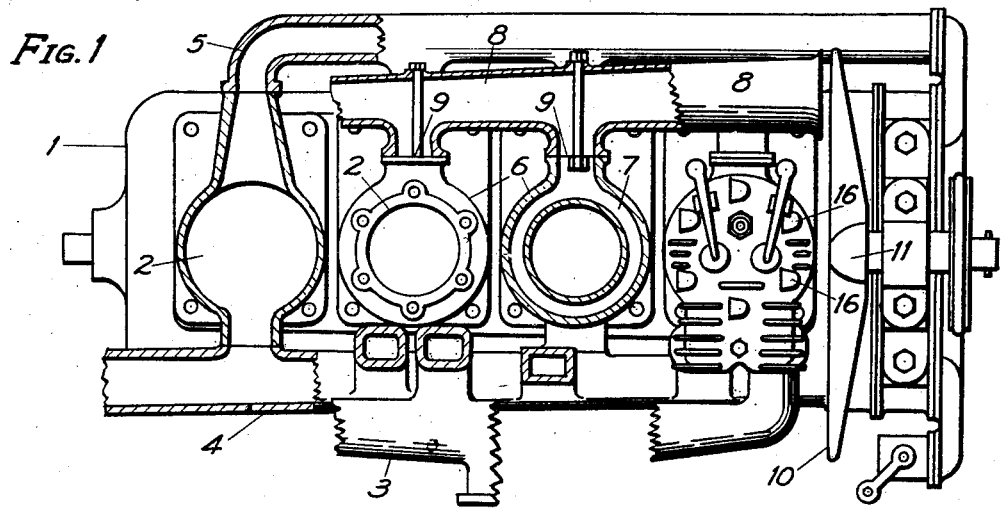
Figure 1 is a top plan view of an engine with parts broken away.
Figure 2:
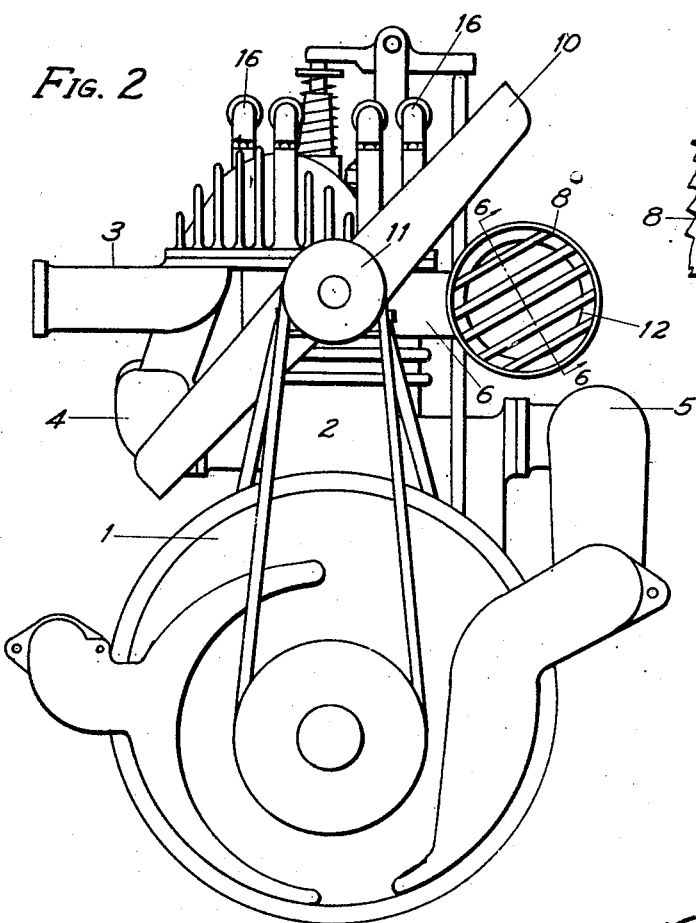
Figure 2 is an end elevation of the engine.
Figure 6:
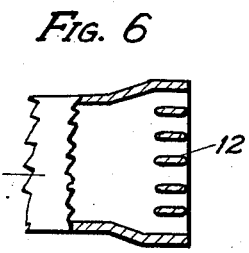
Figure 6 is a detail sectional view as seen along line 6—6, Fig. 2.
Figure 4:
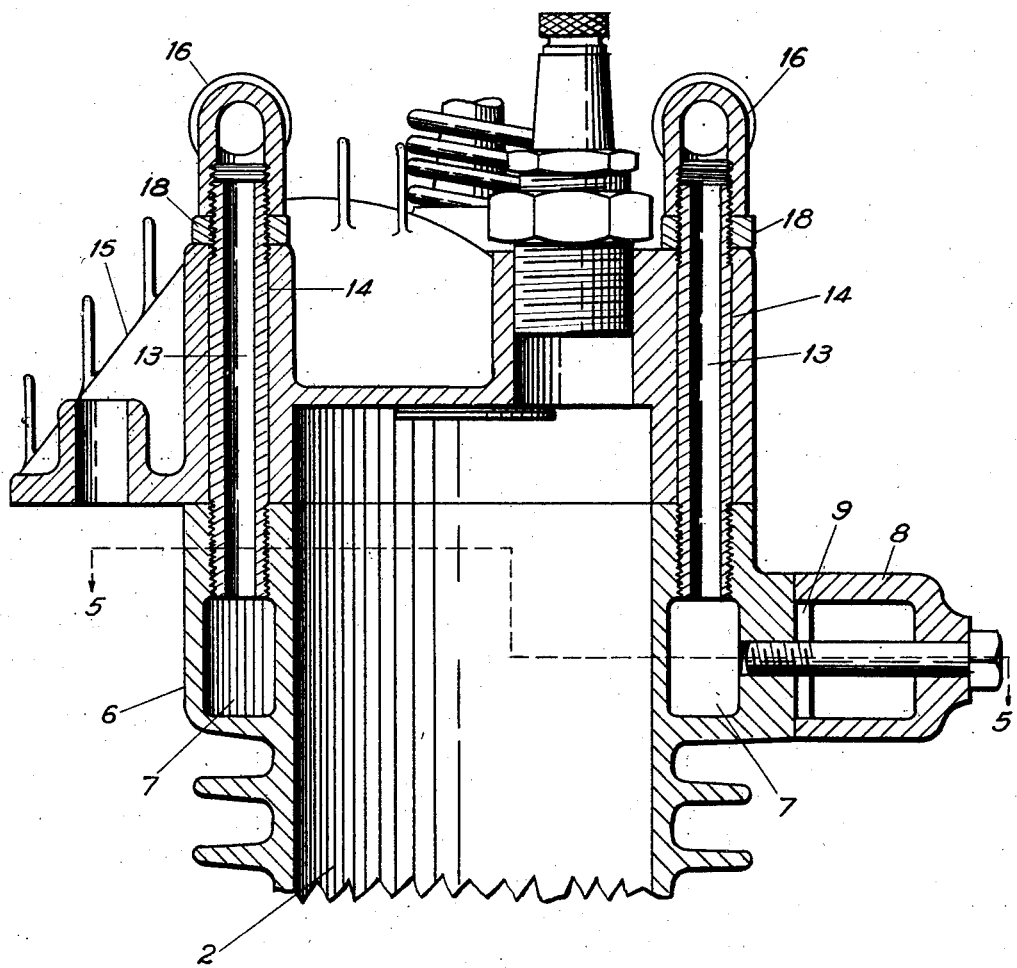
Figure 4 is a detail sectional view along line 4—4, Fig. 3.

Referring to the drawings in which similar reference numerals designate corresponding parts thruout the several views, the numeral 1 designates an engine of the internal combustion type having a plurality of cylinders 2, to which are attached an intake manifold 3, an exhaust manifold 4 and an air conveying manifold 5, said manifolds being attached respectively to the several ports of the engine cylinders.

Each of the cylinders 2 is provided with a circumferentially arranged jacket 6, forming an air passage 7 around the cylinder preferably at a point subjected to the greatest amount of heat, air being conveyed to and thru said air passages 7 by means of a tube 8, said tube being open and preferably flared at one end and closed at its opposite end, the tube having ports 9 communicating with the passages 7. The flared end of the tube 8 is so located that a portion of the blast of air caused by the blades 10 of a blast fan 11 will be forced into the tube 8 and thence into and thru the passages 7. In order to induce the air to enter the tube 8, a plurality of baffles 12 are extended across the open end of the tube, in a manner to gather the greatest degree of air as the fan blades whirl past the tube.

The air escapes from the passages 7 thru vertical ports 13, in this instance, thru hollow bolts 14 employed for securing the cylinder head 15 to the cylinders 2, the inner end of the openings in the bolts communicating with the passages 7 while the upper ends thereof extend above the heads of the cylinders, although it will be understood that where solid heads are formed on the cylinders, openings (not shown) are preferably bored thru the head and parts of the cylinder to form escape openings for the air passing into the passages 7.

The fan 11 is located at the forward end of the engine so that the blast therefrom will pass towards the rear end of the engine. As this blast is forced across the upper ends of the bolts 14, which has a tendency to retard the escape of the air thru the ports 13, to overcome this objectionable feature, cowls 16 are threaded or otherwise secured over the upper ends of the ports 13. The open ends 17 of the cowls 16 are preferably flared and turned towards the rear end of the engine so that the blast of air will not pass directly over the end of the ports 13, but will be shunted around the ends of the ports and as the air from the fan passes the ends of the cowls, a suction effect is imparted to the air escaping from the ports 13, thus aiding the circulation of the air thru the passages 7.

Figure 7:
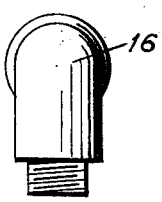
Figure 7 is an elevation of a modified form of cowl.

In the example shown the lower ends of the bolts 14 are threaded into the walls of the jacket 6, while nuts 18 are threaded onto the projecting ends of the bolts, and the cowls 16 are threaded onto the bolts 14 above the nuts 18. The bolts 14, in this instance, are employed for locking the head 15 onto the cylinders 2, but in the event the head is formed integral with the cylinder, the bores 13 are to be formed thru the cylinder head and contiguous wall of the cylinder and jacket, in which event the cowls 16 are threaded or otherwise secured onto the upper ends of the bores, as shown in Fig. 7, or the cowls may be cast integral with the head, if preferred.

I claim as my invention:

1. The combination with the cylinders of an engine having passage forming jackets surrounding the same, and bores thru which the air escapes from said passages, of means for directing a blast of air over the exterior of said cylinders, means for collecting a portion of the blast of air and directing the same into and thru said passages, and means at the discharge ends of said bores for causing the external blast of air to create a suction thru said bores and aid in the discharge of the air from said passages.

2. The combination with the cylinders of an engine, means for forming air passages around said cylinders adjacent the firing chambers therein, and a removable head for each cylinder, of hollow means extending downwardly through said heads and cylinders for attaching said heads to said cylinders and forming openings for the escape of air from said air passages, and means at the outer ends of said securing means for directing the air escaping therefrom rearwardly.

3. An engine having cylinders, heads removably attached to said cylinders, jackets surrounding said cylinders forming air passages, hollow bolts for securing said heads to said cylinders and provide means for the escape of air from said air passages, and means at the outer ends of said bolts for directing the air escaping therefrom rearwardly.

4. The combination with the cylinders of an engine having passage forming jackets surrounding the same, and bores through which the air escapes from said passages, of means for directing a blast of air over the exterior of said cylinders, and means for collecting a portion of the blast of air and directing the same into and through said passages and bores.

5. An engine having cylinders, removable heads on said cylinders, jackets surrounding said cylinders forming circular air passages, vertical bores extending through said head and cylinders to said jackets, hollow means extending through said bores for attaching said heads to said cylinders, and cowls associated with the upper ends of said head securing means, the open ends of which are substantially in a horizontal plane and co-directional.

6. The combination with the cylinders of an engine, and heads removably attached thereto, of bolts for securing said heads to said cylinders, said bolts having openings longitudinally therethrough for the passage of air, and cowls attached to the outer ends of said bolts.

In testimony whereof, I have hereunto set my hand June, 1929, A. D.

OWEN H. SPENCER.